US010031918B2

(12) United States Patent
Chang et al.

(10) Patent No.: US 10,031,918 B2
(45) Date of Patent: *Jul. 24, 2018

(54) FILE SYSTEM AND METHOD OF FILE ACCESS

(71) Applicant: SANDISK TECHNOLOGIES INC., Plano, TX (US)

(72) Inventors: Robert Chang, Danville, CA (US); Po Yuan, Milpitas, CA (US); Xian Jun Liu, San Jose, CA (US); Bahman Qawami, San Jose, CA (US); Haluk Tanik, Mountain View, CA (US)

(73) Assignee: SANDISK TECHNOLOGIES LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,670

(22) Filed: Dec. 23, 2013

(65) Prior Publication Data

US 2014/0108465 A1    Apr. 17, 2014

Related U.S. Application Data

(63) Continuation of application No. 12/495,450, filed on Jun. 30, 2009, now Pat. No. 8,645,438.

(51) Int. Cl.
*G06F 7/00* (2006.01)
*G06F 17/30* (2006.01)

(52) U.S. Cl.
CPC .. *G06F 17/30091* (2013.01); *G06F 17/30218* (2013.01)

(58) Field of Classification Search
CPC ........ G06F 17/30067; G06F 17/30091; G06F 17/30575; G06F 17/30218
See application file for complete search history.

(56) References Cited

U.S. PATENT DOCUMENTS

| 5,062,042 | A | * | 10/1991 | Binkley | ............... G06F 13/105 |
| 5,655,119 | A | * | 8/1997 | Davy | ............... G06F 17/30135 |
| 5,701,459 | A | * | 12/1997 | Millett | ............... G06F 17/30625 |
| 5,802,312 | A | | 9/1998 | Lazaridis et al. | |
| 6,654,794 | B1 | * | 11/2003 | French | ................... H04L 29/06 709/217 |
| 6,745,311 | B2 | | 6/2004 | Fabrizio et al. | |
| 7,478,217 | B2 | | 1/2009 | Lin | |
| 2001/0041989 | A1 | * | 11/2001 | Vilcauskas et al. | ............... 705/1 |

(Continued)

OTHER PUBLICATIONS

Notice of Allowance and Fee(s) Due dated Oct. 8, 2013 in U.S. Appl. No. 12/495,450, 17 pages.

(Continued)

*Primary Examiner* — Hasanul Mobin
(74) *Attorney, Agent, or Firm* — Vierra Magen Marcus LLP

(57) ABSTRACT

A file system and method of file access are disclosed. In a particular embodiment, a method is performed at a host device coupled to a data storage device, where the host device includes a memory storing a file data structure. The host device receives a request to open a file and, in response to the request, retrieves location data of the file from the file data structure. The host device reads data of the file from the data storage device based on the location data and extracts metadata from the data of the file.

19 Claims, 17 Drawing Sheets

(56) References Cited

U.S. PATENT DOCUMENTS

| | | |
|---|---|---|
| 2002/0015252 A1* | 2/2002 | Noble ................... G06F 3/061 |
| | | 360/72.1 |
| 2003/0050974 A1* | 3/2003 | Mani-Meitav et al. ...... 709/203 |
| 2003/0065983 A1* | 4/2003 | Miller et al. .................... 714/42 |
| 2003/0115219 A1* | 6/2003 | Chadwick ......... G06F 17/30017 |
| 2004/0044849 A1 | 3/2004 | Stence et al. |
| 2004/0073727 A1* | 4/2004 | Moran ................... G06F 1/1613 |
| | | 710/74 |
| 2004/0128269 A1* | 7/2004 | Milligan et al. .................. 707/1 |
| 2005/0256838 A1 | 11/2005 | Lasser |
| 2005/0289237 A1* | 12/2005 | Matsubara ............ H04L 67/104 |
| | | 709/232 |
| 2006/0161749 A1* | 7/2006 | Chen ................... G06F 12/1433 |
| | | 711/164 |
| 2006/0248165 A1* | 11/2006 | Sridhar ............... H04L 41/5003 |
| | | 709/218 |
| 2007/0005775 A1* | 1/2007 | Philips .......................... 709/227 |
| 2007/0022129 A1* | 1/2007 | Bahar .................... G06F 9/5011 |
| 2008/0134028 A1* | 6/2008 | Whitmyer ............. G06F 9/4443 |
| | | 715/700 |
| 2008/0288710 A1* | 11/2008 | Maeda et al. ................. 711/102 |
| 2008/0307192 A1 | 12/2008 | Sinclair et al. |
| 2009/0164696 A1* | 6/2009 | Allen .................. G06F 12/0246 |
| | | 711/1 |

OTHER PUBLICATIONS

Non-Final Office Action dated Jun. 20, 2011 in U.S. Appl. No. 12/495,450, 24 pages.

Final Office Action dated Feb. 1, 2012 in U.S. Appl. No. 12/495,450, 26 pages.

\* cited by examiner

FILE SYSTEM AND METHOD OF FILE ACCESS

CROSS-REFERENCE TO RELATED APPLICATIONS

This patent application is a continuation application of and claims priority from U.S. patent application Ser. No. 12/495,450 filed Jun. 30, 2009, the contents of which is incorporated by reference herein in its entirety.

FIELD OF THE DISCLOSURE

The present disclosure is generally related to facilitating access to one or more of a series of files stored in a non-volatile memory device.

BACKGROUND

Improved device density in manufacture of non-volatile memory devices, such as flash memory, enables storage of increasingly larger quantities of data in very small packages. For example, hundreds or even thousands of music files or dozens of video files may be stored on a removable non-volatile memory device that is approximately the size of a small or medium-sized coin. Removable non-volatile memory devices are so compact and portable that several of the devices may be easily transported in an accessory pouch, a pocket, a handbag, a book bag, or another carrier. A user can swap memory devices to access different stored content, such as to switch between different music libraries, between a music library and a video library or between a video library and a photograph library, as illustrative examples.

Music files, image files, and other media files are conventionally accessed by file systems using a file name. However, users typically select media files by accessing a metadata table generated for the media files to display, for example, a song name. Conventionally, when a non-volatile memory device is inserted in a host device to be accessed by a media player or other media access software, the host device causes a metadata table to be generated for the media files stored on the non-volatile memory device. Metadata generation causes a delay before enabling full access to the media on the non-volatile memory device. Conventionally, metadata generation involves using an open file command to open each of the files from which metadata is to be extracted. The open file command specifies a file name of the file to be opened. The file name is then compared to each of the file names listed in the file directory until the file is found. Once the file is found by its file name, the address of a first cluster of the file is used to open the file. Unfortunately, when the file directory lists hundreds or thousands of files, using the open command to open each file by name to extract metadata may take a long time. For example, with a large non-volatile memory device that is filled with music files, such as a 16 GB non-volatile memory card that may accommodate on the order of one-thousand songs, accessing the file directory, opening each media file, and extracting the metadata may take as long as thirty minutes. A user experience may therefore be enhanced by reducing a delay associated with generating the metadata table.

SUMMARY

According to exemplary embodiments of the present disclosure, media files stored on a non-volatile memory device may be accessed more quickly by caching an address of a media file identified during a file location operation and providing the cached address of the media file to a subsequent open file command. When the file location and file open operations reference the same file, the file open command may have immediate access to the file without conducting a directory search for the file. The increased access speed enables rapid extraction of metadata from numerous media files or rapid switching between media files.

According to an embodiment of the present disclosure, each time a file is opened, e.g., in the process of building a metadata table, a get next address command is executed to get an address of a next stored media file and to cache the address in anticipation of a subsequent file open command. As a result, when the next open file command requests the next media file, instead of scanning all the files in the file directory by name to find the next media file, the cached address of the next file is supplied to the open file command. The open file command thus can sequentially open all the files on the non-volatile storage device without performing time-consuming name scans of each file in the file directory. Avoiding the name scans of each file in the file directory may improve the speed of generating the metadata table by one-thousand-fold.

In a particular embodiment, upon being coupled to a non-volatile memory device or otherwise directed to first access the non-volatile memory device, a host device may locate and retrieve file location data for a first file listed identified by a first entry in a file directory for the non-volatile memory device. The file location data is stored in a first file data structure in a memory of the host device so that, when a request to open the first file is received, the file location data is provided to enable the open file command to access and open the file without scanning the file directory for the file by name. In another particular embodiment, in addition to the host device locating, retrieving, and storing the first location data for a first file stored on the non-volatile memory device, the host device may locate and retrieve second location data for a second file stored on the non-volatile memory. Caching a second data location further enhances quick switching between a first and second file.

One particular advantage provided by embodiments disclosed herein enables rapid access to successively listed files in a file directory by reducing redundant match operations associated with an open file command.

Other aspects, advantages, and features of the present disclosure will become apparent after review of the entire application, including the following sections: Brief Description of the Drawings, Detailed Description, and the Claims.

DETAILED DESCRIPTION

Figure 1:
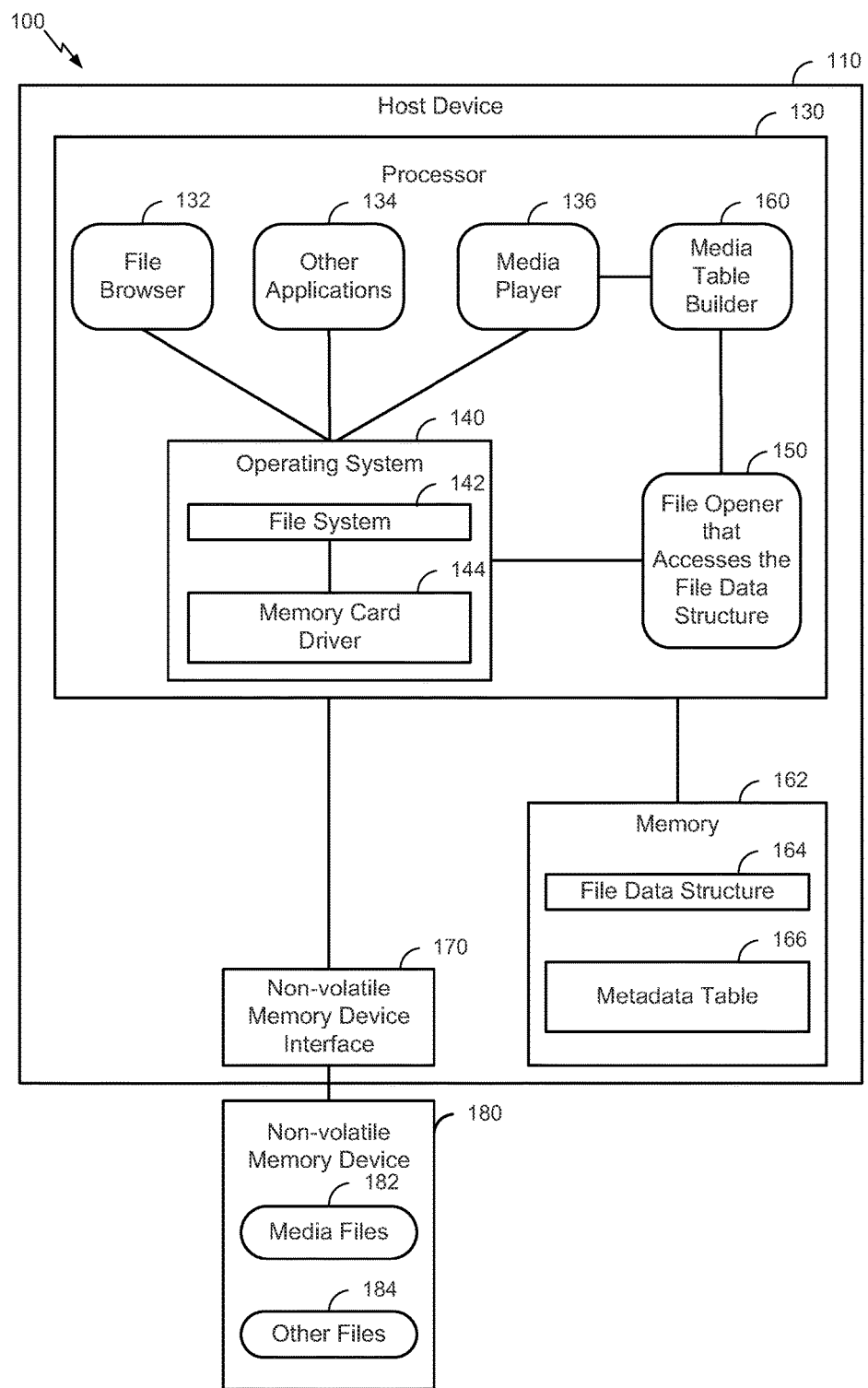
FIG. 1 is a block diagram of a system that includes a host device with a file opener that accesses a file data structure maintained in a memory of the host device operatively coupled to a non-volatile memory device storing a plurality of media files.

FIG. 1 is a block diagram of system 100 that includes a host device 110 with a file opener 150 that accesses a file data structure maintained in a memory of the host device 110 operatively coupled to a non-volatile memory device 180 storing a plurality of media files 182. The file opener 150 accesses a file data structure 164 that is maintained in a memory 162 of the host device 110 to facilitate rapid access to media files 182 stored on the non-volatile memory device 180.

The host device 110 may include a dedicated audio media or an audio/video media player. The host device 110 also may include one or more other digital devices, such as a portable computer, a wireless telephone, a wireless network device, a game system or game device, a digital camera, or any other device that enables a user to access the media files 182 or other files 184 stored on the non-volatile memory device 180.

The host device 110 includes a processor 130 that supports a plurality of processes. The processor 130 includes a file browser 132, a media player 136, a media table builder 160, a file opener 150 that accesses a file data structure 164, and other applications 134. The processor 130 also supports an operating system 140. The operating system 140 provides an interface between hardware systems of the host device 110 and software systems. The operating system 140 also may include a file system 142 and a memory card driver 144 that provides a programming interface through which the operating system 140 may interact with the non-volatile memory device 180 via a non-volatile memory device interface 170.

The host device 110 also includes a memory 162 that is operably coupled to the processor 130. According to a particular embodiment, the memory 162 stores one or more file data structures 164 and a metadata table 166. As is described further below, the one or more file data structures 164 in the memory 162 can each store file location data for one of the media files 182 stored on the non-volatile memory device 180. The one or more file data structures 164 may be used to expedite access to media files 182 stored on the non-volatile memory device 180 to enable the media table builder 160 to rapidly create the metadata table 166.

The file opener 150 is accessible by the media table builder 160 or other processes supported by the processor 130. The file opener 150 interacts with the operating system 140. When the non-volatile memory device 180 is coupled to the host device 110 via the non-volatile memory device interface 170, the file opener 150 may identify from a file directory (not shown) a first of the media files 182 stored on the non-volatile memory device 180 and store location data for the first file in the file data structure 164 in the memory 162 of the host device 110. When the operating system 140 issues an open file command for that file, instead of the file system 142 having to scan the file directory to match the file name of the first file, the open file command is provided with the location data for the first file from the file data structure 164.

In addition, when the open file command is issued from the operating system 140, the file opener 150 may cause a get next command to be issued to retrieve location data for a next of the media files 182 stored on the non-volatile memory device 180 and to store the location data of the next media file in the file data structure 164. When a next open file command seeks to open the next of the media files 182, the open file command again is provided with the location data from the file data structure 164. Thus, when opening one or more of a sequence of media files, e.g., as is performed in building the metadata table 166, files may be opened without matching file names in the file directory for the files stored on the non-volatile memory device 180.

Although various components depicted herein are illustrated as block components and described in general terms, such components may include one or more microprocessors, state machines, or other circuits configured to enable the host device 110 or the non-volatile memory device 180 to perform the particular functions attributed to such components, or any combination thereof. For example, the file opener 150 may represent physical components, such as hardware controllers, state machines, logic circuits, or other structures to enable the host device 110 of FIG. 1 to open files and extract metadata from the files, as described below. Alternatively, or in addition, executable instructions that are executed by a processor that may be included in the host device 110 may be stored at a separate memory location that is not part of the memory 130, such as at a read-only memory (ROM) (not shown).

In a particular embodiment, the non-volatile memory device 180 may be a portable device configured to be selectively coupled to one or more external devices. However, in other embodiments, the non-volatile memory device 180 may be attached or embedded within one or more host devices, such as within a housing of a portable communication device. For example, the non-volatile memory device 180 may be within a packaged apparatus such as a wireless telephone, personal digital assistant (PDA), gaming device or console, portable navigation device, or other device that uses internal non-volatile memory. In a particular embodiment, the non-volatile memory device 180 includes a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

Figure 2:
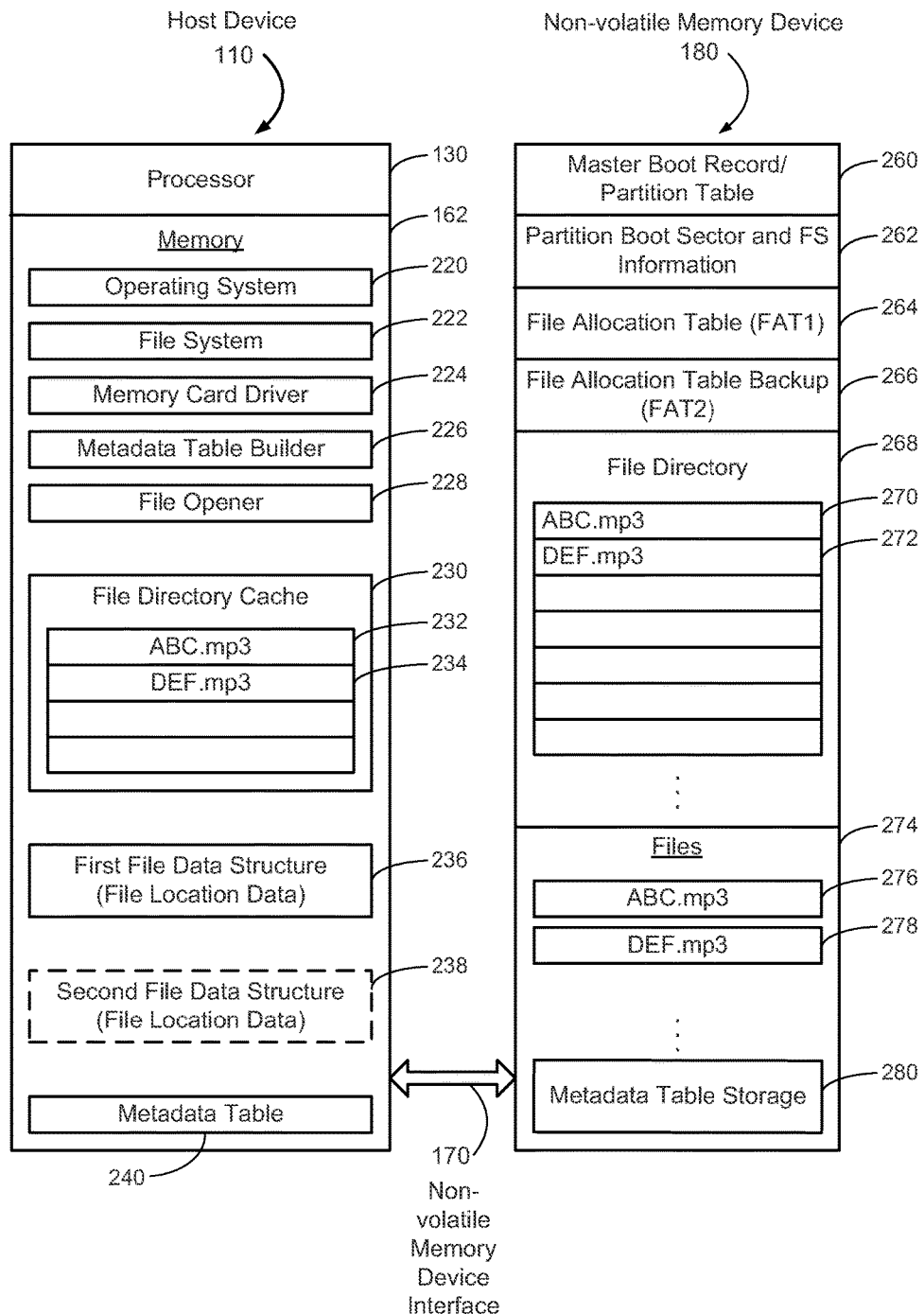
FIG. 2 is a memory diagram of the host device and the non-volatile memory device of FIG. 1 depicting first and second file data structures maintained in the memory of the host device to increase the speed at which files stored on the non-volatile memory device may be accessed.

FIG. 2 is a memory diagram of the host device 110 and the non-volatile memory device 180 of FIG. 1. The memory 162 of the host device 110 maintains a first file data structure 236 and, optionally, a second file data structure 238. The file data structures 236 and 238 stored in the memory 162 of the host device 110 are instances of the file data structure 164 of FIG. 1 and are used to expedite access to files stored on the non-volatile memory device 180. As in FIG. 1, the host device 110 and the non-volatile memory device 180 are functionally coupled by a non-volatile memory device interface 170.

The host device 110 of FIG. 2, as shown in FIG. 1, includes the processor 130 and the memory 162. Processes depicted as being performed by the processor 130 in FIG. 1 may be performed by the processor 130 executing instructions stored in the memory 162. For example, the memory 162 may store an operating system 220 and a file system 222 that maintain instructions by which the processor 110 accesses files stored in the non-volatile memory device 180 or in other locations. The memory 162 may store a memory card driver 224 that includes a programming interface for a particular non-volatile memory device 180 coupled to the host device 110. In addition, the memory may store a metadata table builder 226 and a file opener 228, such as the file opener 150 and the metadata table builder 160 as described with reference to FIG. 1 and that are described further below.

The memory 162 of the host device 110 also may maintain a file directory cache 230. The file directory cache 230, for example, may be used to store a copy of at least a portion of a file directory for the non-volatile memory device 180, such as the file directory 268 of the non-volatile memory device 180. For example, the file directory 268 lists an ABC.mp3 entry 270 and a DEF.mp3 entry 272 that represent ABC.mp3 276 and DEF.mp3 278, where ABC.mp3 276 and DEF.mp3 278 may be two of hundreds or thousands of files 274 stored in the non-volatile memory device 180. By copying at least a portion of the file directory 268 to the file directory cache 230 in the memory 162 of the host device 110, the processor 130 of the host device 110 can access contents of the file directory 268 more quickly than by multiple, sequential accesses via the non-volatile memory device interface 170.

The non-volatile memory device 180 includes a master boot record or partition table 260, a partition boot sector and file system information 262, a file allocation table (FAT1) 264 and a backup of the file allocation table (FAT2) 266. The non-volatile memory device 180 also includes the aforementioned file directory 268 that lists entries for files such as media files ABC.mp3 276 and DEF.mp3 278 in a portion of the non-volatile memory device 180 where files 274 are stored. In addition, according to a particular illustrative embodiment, among the files 274, metadata table storage 280 may be maintained to store a copy of the metadata table 240 generated by the host device 110.

The memory 162 of the host device 110 includes a first file data structure 236 and, optionally, a second file data structure 238. The first file data structure 236 stores file location data for a first media file stored among files 274 stored in the non-volatile memory device 180, such as ABC.mp3 276 or DEF.mp3 278. For example, the first file data structure may store a portion or all of the information of a directory entry 270 or 272, such as a file name and extension and a beginning file cluster identifier (i.e., location data). The first file data structure 236 is populated with file location data for one of the files 274 as a result of a get first or a get next file command issued by the operating system 220. When the memory 162 of the host device 110 maintains a single, first file data structure 236, in response to a get first or a get next command, file location data for one file, such as ABC.mp3 276, may be stored in the first file data structure 236. When an open file command for ABC.mp3 276 is issued by the operating system 220, the file location data for ABC.mp3 276 can be readily provided to the open file command. Once the open file command has been executed, the file opener 228 may then perform, prior to receiving a request from an application such as the metadata table builder 226, a get next command to get the location data for a next media file, such as DEF.mp3 278, and store the new location data in the first file data structure 236. Thus, when an open file command for DEF.mp3 278 is issued by the operating system 220, such as at the request of the metadata table builder 226, the file location data for DEF.mp3 278 then can be readily provided to the open file command.

In an embodiment where the memory 162 includes the a second file data structure 238, when the first file, such as ABC.mp3 276 is opened and a get next command has been executed to predictively fetch location information for a next file, such as DEF.mp3 278, the location data for ABC.mp3 276 may continue to be stored in the first file data structure 236 while the location data for DEF.mp3 is stored in the second file data structure 238. In this case, if a user or application is accessing the media files, the host device 110 will enable the user to quickly switch back and forth between ABC.mp3 276 and DEF.mp3 278. The file location data will be available in the file data structures 236 and 238 for both media files 276 and 278, respectively, without having to scan the file directory cache 230 in the memory 162 of the host device or scan the file directory 268 of the non-volatile memory device 180.

When the file opener 228 is being used by a metadata table builder 226 to extract metadata from a series of media files in a file directory sequence, once the metadata table builder 226 opens one media file, there may be no disadvantage to overwrite the file location data stored in the first file data structure 236 with file location data for a next media file. According to one particular illustrative embodiment, once the host device 110 generates the metadata table 238, a copy of the metadata table 238 may be copied to the metadata table storage 280 in the non-volatile memory device 180. When a copy of the metadata table 238 is stored in the metadata table storage 280, when the non-volatile memory device 180 is next coupled to the host device 110—or a to a different but compatible host device—the metadata table 238 may be retrieved from the non-volatile memory device 180 into memory of the host device, avoiding the process of building or rebuilding the metadata table 238 for the files 274 stored on the non-volatile memory device 180.

FIGS. 3-9 are data flow diagrams depicting an embodiment using file data structures 236 and 238 maintained in the memory 162 of the host device 110 to increase the speed at which data files stored on the non-volatile memory device 180 may be accessed. As will be described with reference to FIGS. 3-9, the file opener 228 and the file data structures 236 and 238 expedite access to files, such as ABC.mp3 276 and DEF.mp3 278.

Figure 3:
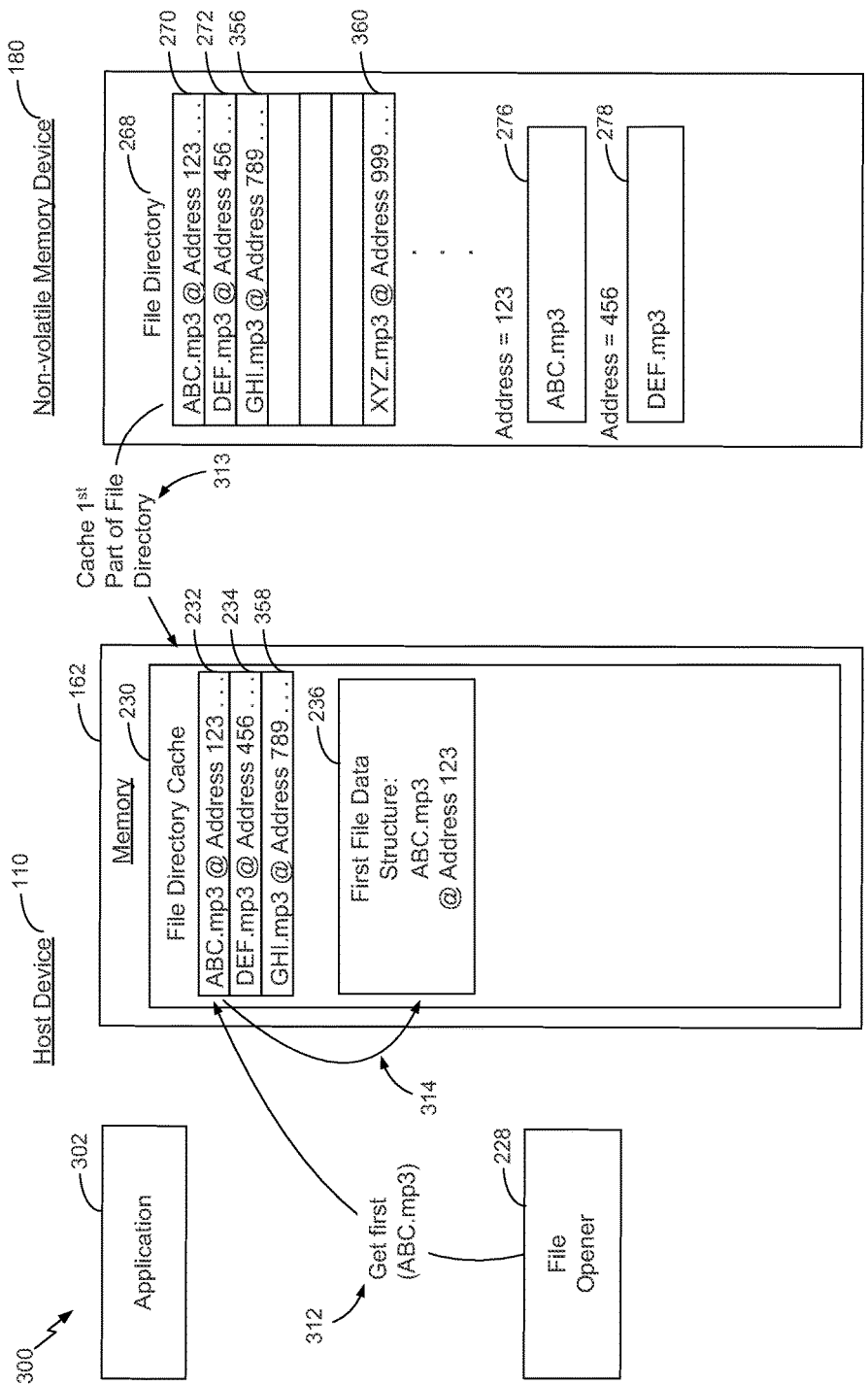
FIGS. 3-9 are data flow diagrams depicting an embodiment using file data structures maintained in the memory of the host device to increase the speed at which data files stored on the non-volatile memory device may be accessed.

FIG. 3 shows a system 300 including the host device 110 accessing files from the non-volatile memory device 180. The host device 110 supports an application 302, such as a media player or another application, that is expected to access media files, such as ABC.mp3 276, DEF.mp3 278, or GHI.mp3 356 stored on non-volatile memory device 180. As illustrated, at least a portion of the file directory 268 of the non-volatile memory device 180 is cached or copied 313 to the file directory cache 230 of the host device 110 when the non-volatile memory device 180 is coupled to the host device 110 (such as via the non-volatile memory device interface 170 of FIGS. 1 and 2, not shown) or by virtue of another process. Thus, for example, the file directory cache 230 includes a directory entry 232 for ABC.mp3, a directory entry 234 for DEF.mp3, and a directory entry 358 for GHI.mp3.

Directory entries in the file directory cache 230 or the file directory 268 are located using a get first command and a get next command. The get first command locates a first sequential directory entry and populates the first file data structure 236 with the location data for the file referenced by the first directory entry. The get next command accesses the first file data structure 236 and retrieves a next sequential directory entry. The get first and get next commands may include a specified file extension such as "mp3" and only return a next entry matching the specified file extension.

According to a particular embodiment, when the non-volatile memory device 180 is coupled to the host device 110, the file opener 228 causes the operating system to generate a get first command 312. The first file stored on the non-volatile memory device 180, or at least the first file listed in the file directory 268, which may or may not be the first file stored on the non-volatile memory device 180, is ABC.mp3 276. Thus, the get first command 312, in effect, will seek the file location of ABC.mp3 276. The get first command 312 may be adapted to get the location of a first media file of a specified type, e.g., the first mp3 file or the first file of a number of media types, such as mp3 files, avi files, etc. In response to the get first command 312, the file directory cache 230 is accessed to identify the file location of the first file. The get first command 312 accesses the file directory cache 230 to retrieve file location data from the ABC.mp3 file directory entry 232 and store 314 the file location data for ABC.mp3 276 in the first file data structure 236.

Figure 4:
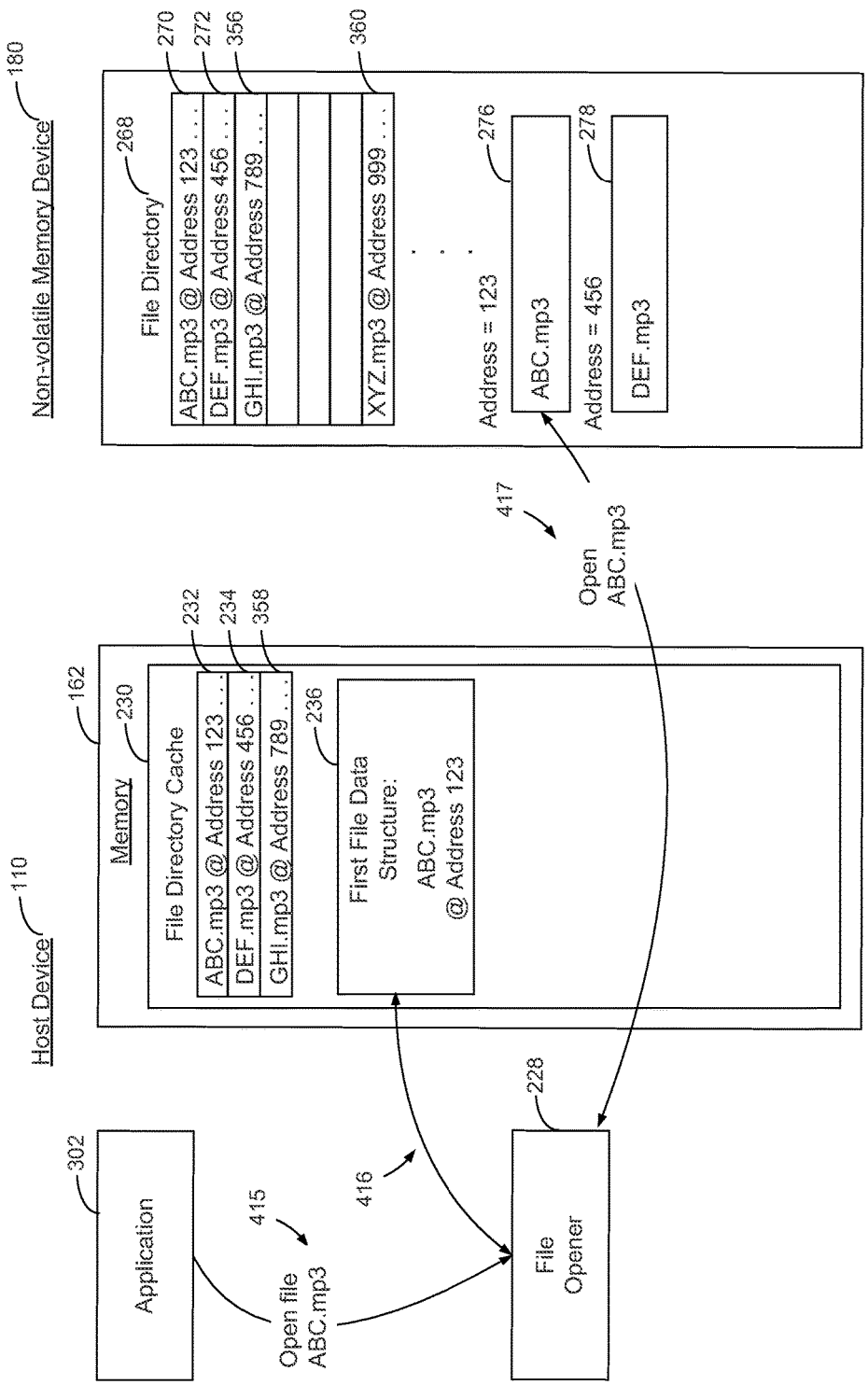

FIG. 4 shows an open file command 415 issued by the application 302 seeking to open ABC.mp3 276. Conventionally, the open file command 415 would have resulted in executing a file name search of the file directory cache 230 in the memory of the host device 110 using a get first command followed by a series of get next commands until a located directory entry matches the requested file name. If the matching file was not found in the file directory cache 230, additional portions of the file directory 268 of the non-volatile memory device 180 would have been copied to the file directory cache 230. The open file command 415 conventionally begins with a first entry in a file directory and searches the file directory until a match is found. Thus, an open file command 415 seeking ABC.mp3 276 would not have involved a long search. However, if a conventional open file command 415 were seeking a file such as XYZ.mp3 360 that may be the last directory entry among hundreds or thousands of media files, a conventional open file command 415 may take a much longer time to process.

As illustrated, the open file command 415 is first diverted by the file opener 228, which performs a read 416 of the first file data structure to determine if the file sought by the open file command 415 is the file for which file location information is stored in the first file data structure 236. Because the file sought by the open file command 415, ABC.mp3 276, corresponds to the file director entry information stored in the first file data structure 236, the file opener 228 provides the open file command 415 with the address of the file ABC.mp3 276 without the open file command 415 having to perform a name search of the file directory cache 230 or the file directory 268 of the non-volatile memory device 180. Using the file location data stored in the first file data structure 236, the file ABC.mp3 276 is opened via an open operation 417.

Figure 5:
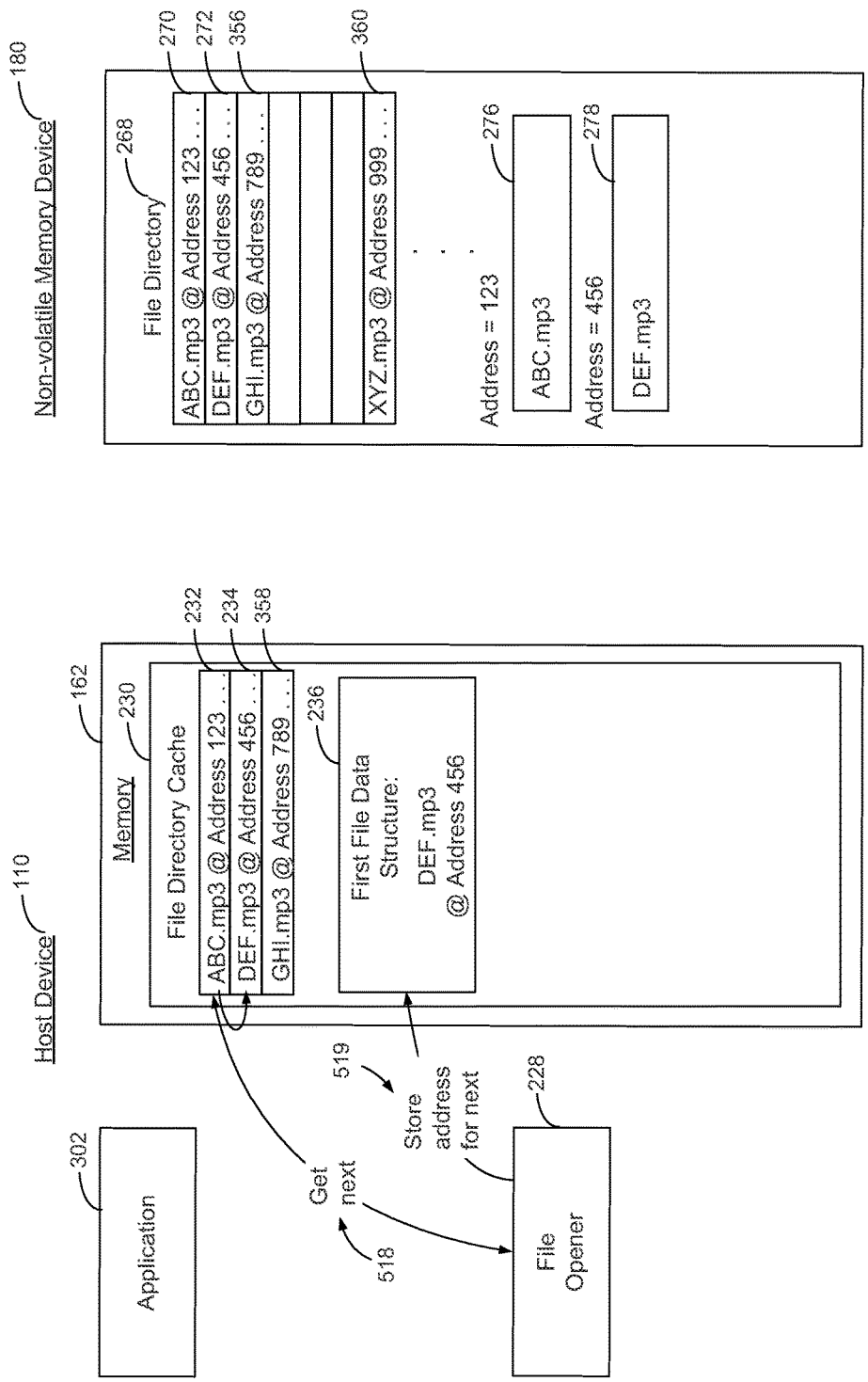

FIG. 5 shows, after the opening of file ABC.mp3 276 in response to the open file command 415 (FIG. 4), the file opener 228 causing a get next command 518 to be generated. The get next command 518 determines from the file directory cache 230 that, because the directory entry 232 for ABC.mp3 was accessed by the previous get command (the get first command of FIG. 3), the next directory entry corresponds to file is DEF.mp3 278. The file opener 228 accesses the DEF.mp3 directory entry 234 to retrieve file location data for DEF.mp3 278. The file opener 228 stores 519 the file location data for DEF.mp3 278 in the first file data structure 236, overwriting the file location data for ABC.mp3 276 that was already opened.

Figure 6:
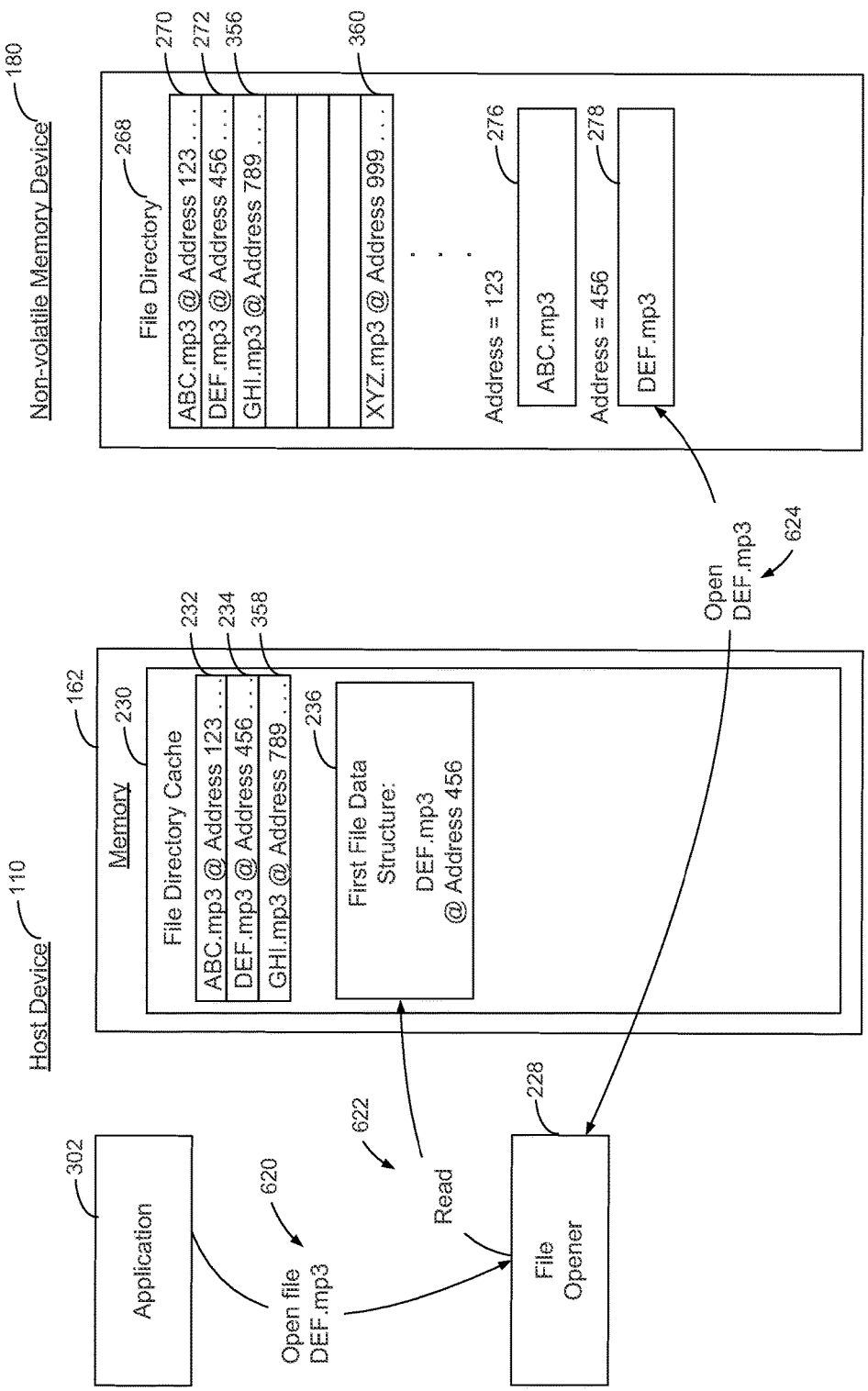

FIG. 6 shows the application 302 generating an open file command 620 seeking to open DEF.mp3 278. Again, conventionally, the open file command 620 would be executed against the file directory cache 230 or the file directory 268, starting with the first file entry and attempting to match file names until an entry for DEF.mp3 278 was located. However, as illustrated, the open file command 620 is redirected by the file opener 228 to read 622 the first file data structure 236 to determine if the first file data structure 236 stores the file location data for DEF.mp3 278. Finding that the first file data structure 236 does store the file location data for DEF.mp3 278, the file opener 228 supplies the file location data for DEF.mp3 278 to the open file command 620, enabling DEF.mp3 278 to be opened 624 without a search of the file directory cache 230 or the file directory 268. As a result, a sequential access and opening of files, such as during a build of a metadata table, can be expedited by predictively acquiring and caching next file location information and redirecting the open file command to first query the cached information.

Figure 7:
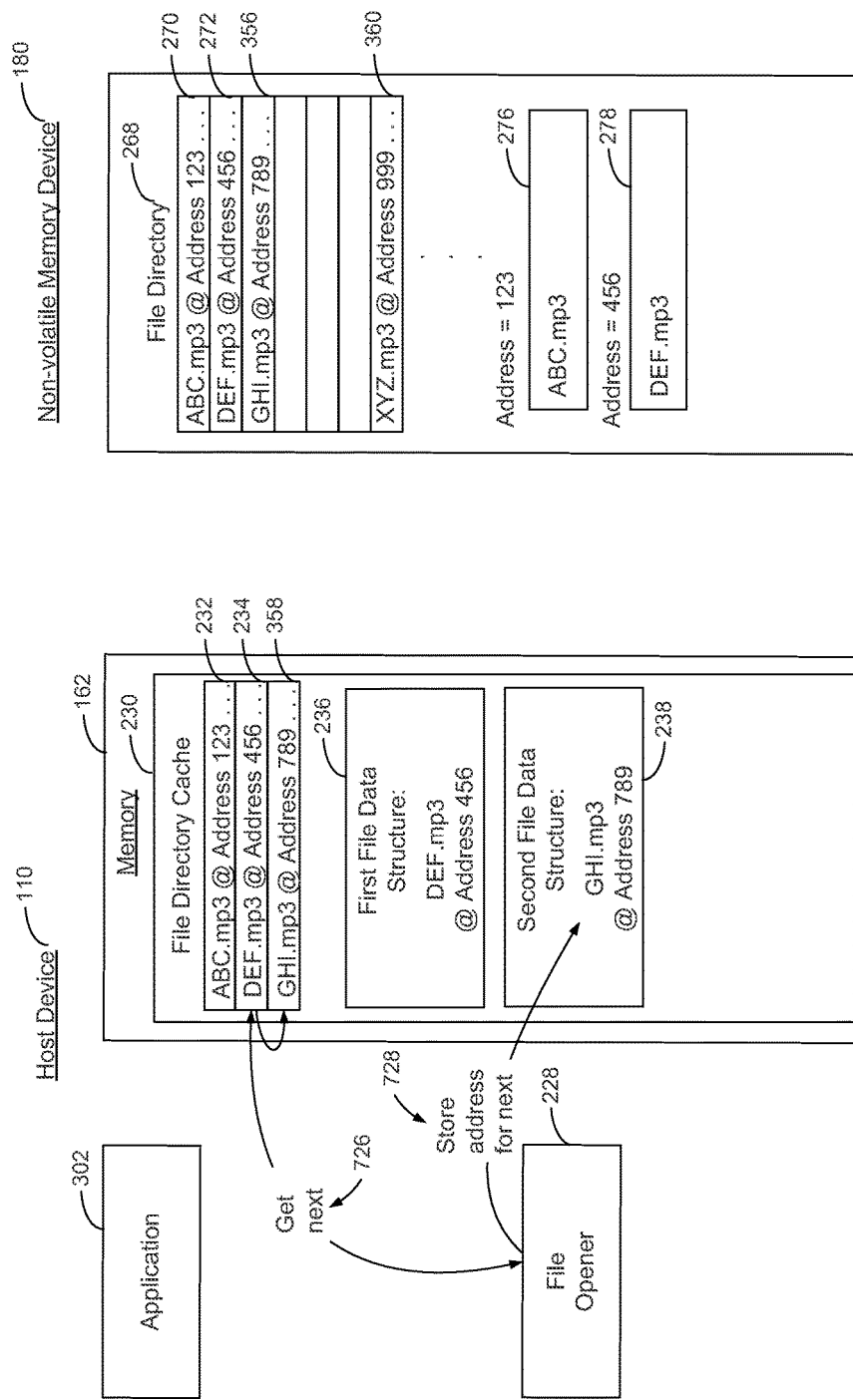

FIG. 7 shows an embodiment of the host device 110 that supports a second file data structure 238 in addition to maintaining the first file data structure 236. After DEF.mp3 278 has been opened (FIG. 6), the file opener 228 causes a get next command 726 to be issued to retrieve the location of the next file or next media file for which an entry is listed in the file directory cache 230. Because an entry for DEF.mp3 278 was retrieved by the last get command, the get next command 726 retrieves file location data from the directory entry 358 for GHI.mp3, the next listed file. However, instead of storing the file location data for GHI.mp3 in the first file data structure 236, the file opener 228 issues a command 728 to store the file location data for GHI.mp3 in the second file data structure 238.

Because the file location data for the currently open file is stored in the first file data structure 236 and the file location data for the next file is stored in the second file data structure 238, if the user wants to skip back to the beginning of the currently open file or perform some other operation on the currently open file, the file location data is still readily available in the first file data structure 236. Using only one file data structure, after executing the get next command 726, the file opener 228 would have overwritten the file location data for the currently open file in the first file data structure 236, and the file location data for the currently open file would not have been as readily available. At the same time, because the file location data is available for the next file or next media file in the second file data structure 238, the next file or next media file also may be quickly accessed. Thus, for example, if a user wants to skip to a next music file in the list, the file location data will be readily available to enable quick access to the next music file.

Furthermore, utilizing multiple file data structures, such as the first file data structure 236 and the second file data structure 238 assists a metadata table builder, such as the metadata table builder 226, in more quickly building a metadata table 240. A metadata table builder builds a metadata table either by locating and opening each file sequentially to extract metadata from the files, or by sequentially locating all of the files and then sequentially opening all of the files to extract metadata to build the metadata tables. Using the first approach, after each file is opened and metadata is extracted from the opened file, using a conventional file open command that scans a file directory may result in an appreciable delay before a next file is located. Using the second approach, once all the files have been located, the files may be sequentially opened to extract the metadata. However, using the conventional file open process of all the located files may be very time consuming, as each file open command requires scanning the file directory for the name of each successive file. By caching file location data for each next file, the process of sequentially locating and opening all of the files or the process of sequentially locating all of the files and then sequentially opening all of the files may both proceed more rapidly, assisting in the generation of the metadata table 240.

Figure 8:
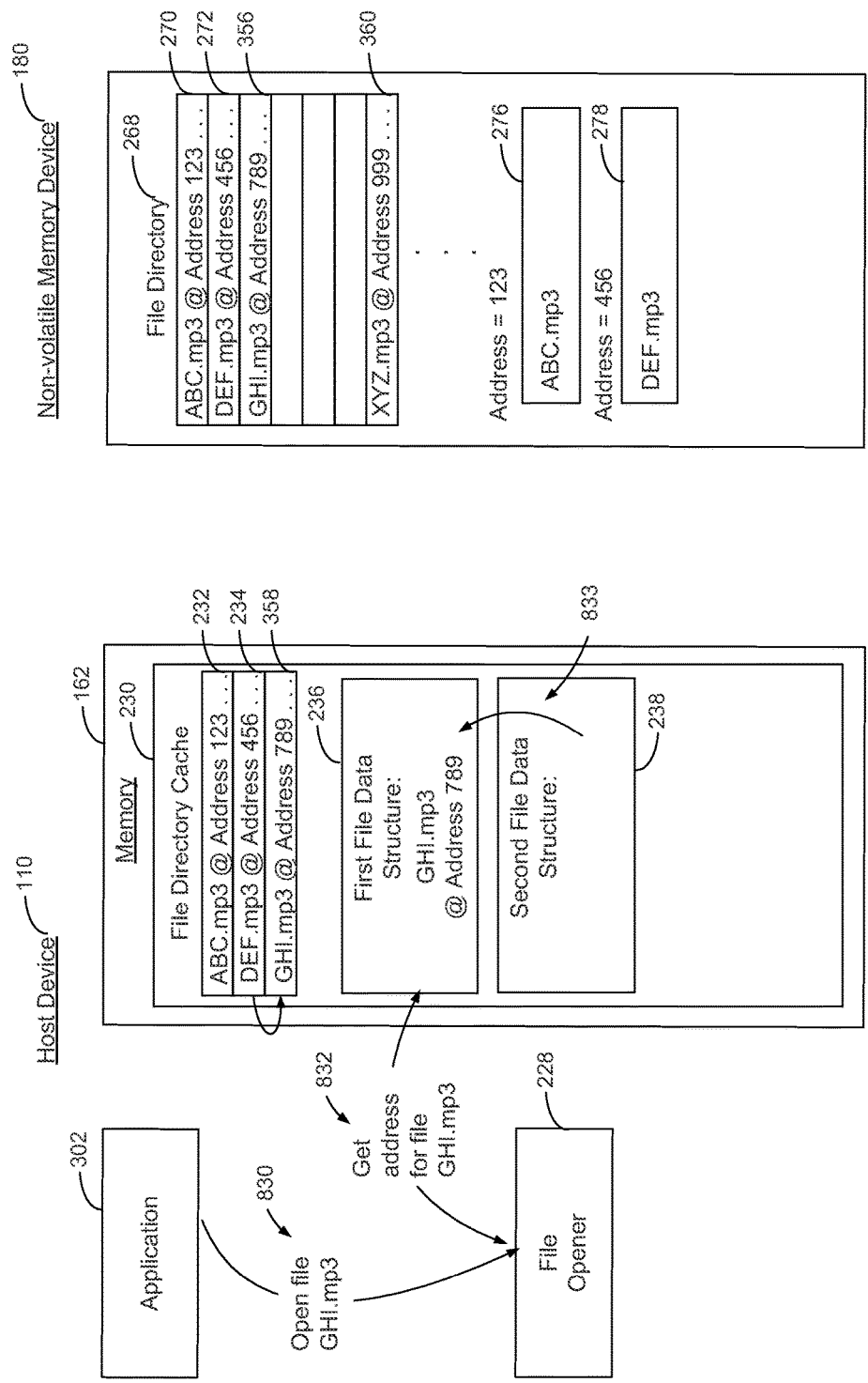

FIG. 8 shows a first alternative for managing two file data structures 236 and 238 when a next open file command 830 results in new file location information being retrieved for storage in one of the two file data structures 236 and 238. According to a particular embodiment illustrated in FIG. 8, when the open file command 830 is issued, the file location data information that was stored in the second file data structure 238 is transferred by a transfer operation 833 to the first file data structure 236. According to this embodiment, the first file data structure 236 always stores the file location information for the file being currently opened or that is currently open and will be the object of an instruction 832 from the file opener 228 to get an address for the file sought by the open file command 830. The second file data structure 238 then remains available to store the file location data for a next file or media file to be retrieved in a subsequent get next operation (not shown in FIG. 8).

Figure 9:
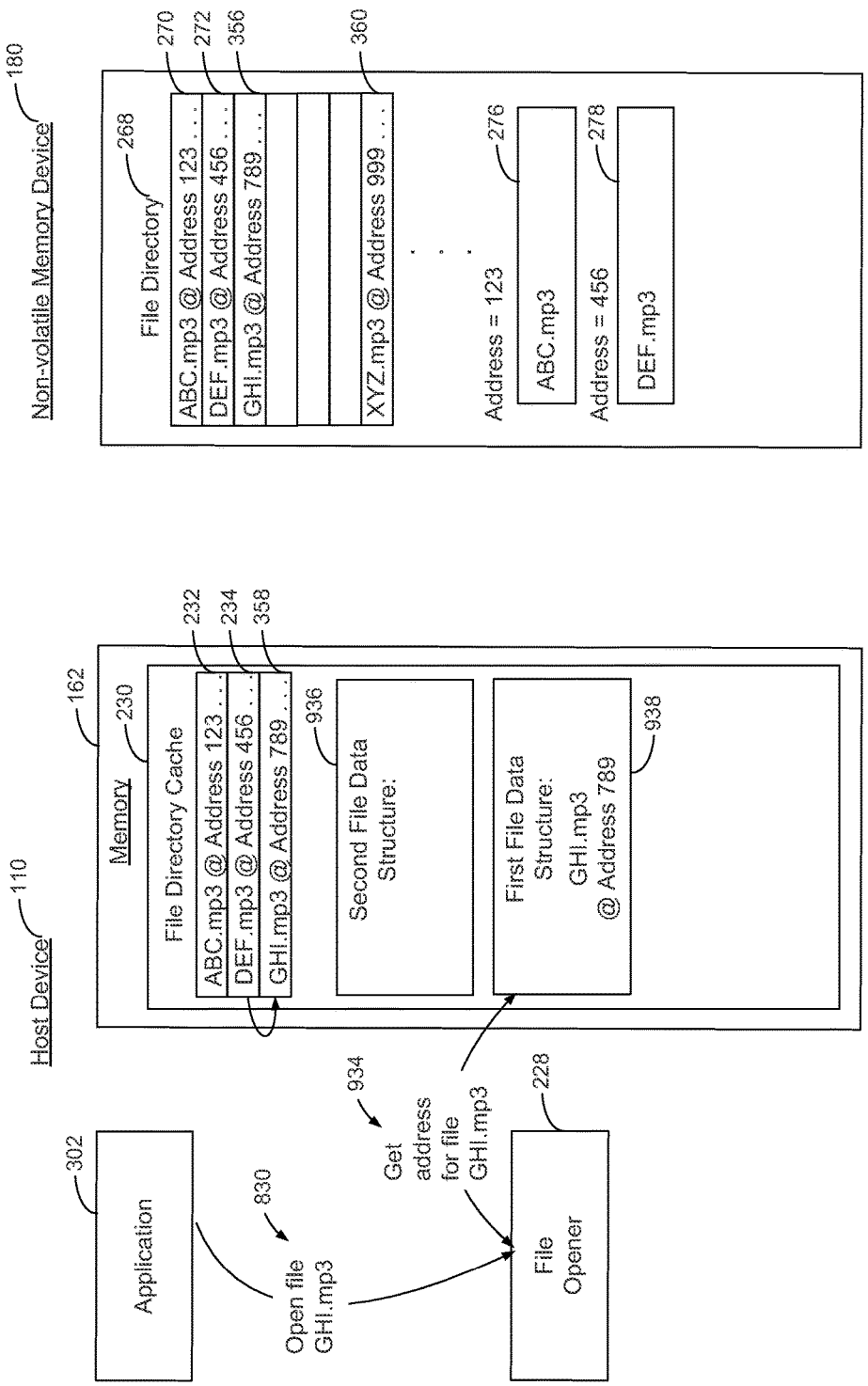

FIG. 9 shows a second alternative for managing two file data structures 236 and 238 when a next open file command 830 results in new file location information being retrieved for storage in one of the two file data structures 236 and 238. According to a particular embodiment described by FIG. 9, when the open file command 830 is issued, the file data structures 236 and 238 are re-designated. Specifically, the first file data structure 236, which now stores file location data for a file that is no longer going to be open as a result of the open file command 830, is re-designated as a new second file data structure 936 to receive file location data to be retrieved by a get next command (not shown in FIG. 9). The second file data structure 238 is re-designated as a new first file data structure 938. The new first file data structure already stores the file location data for the next file that sought by the open file command 830 and thus will be the object of an instruction 934 from the file opener 228 to get the address for the file sought by the open file command 830. The file data structure designated as the first file data structure 938 may always be used by the file opener to get file location data for an open file command while the file data structure designated as the second data structure 936 is open for storing file location data for a next file. Thus, according to the embodiment of FIG. 8, contents of the file data structures are transferred when a next open file command is generated while, according to the embodiment of FIG. 9, the file data structures are re-designated.

Figure 10:
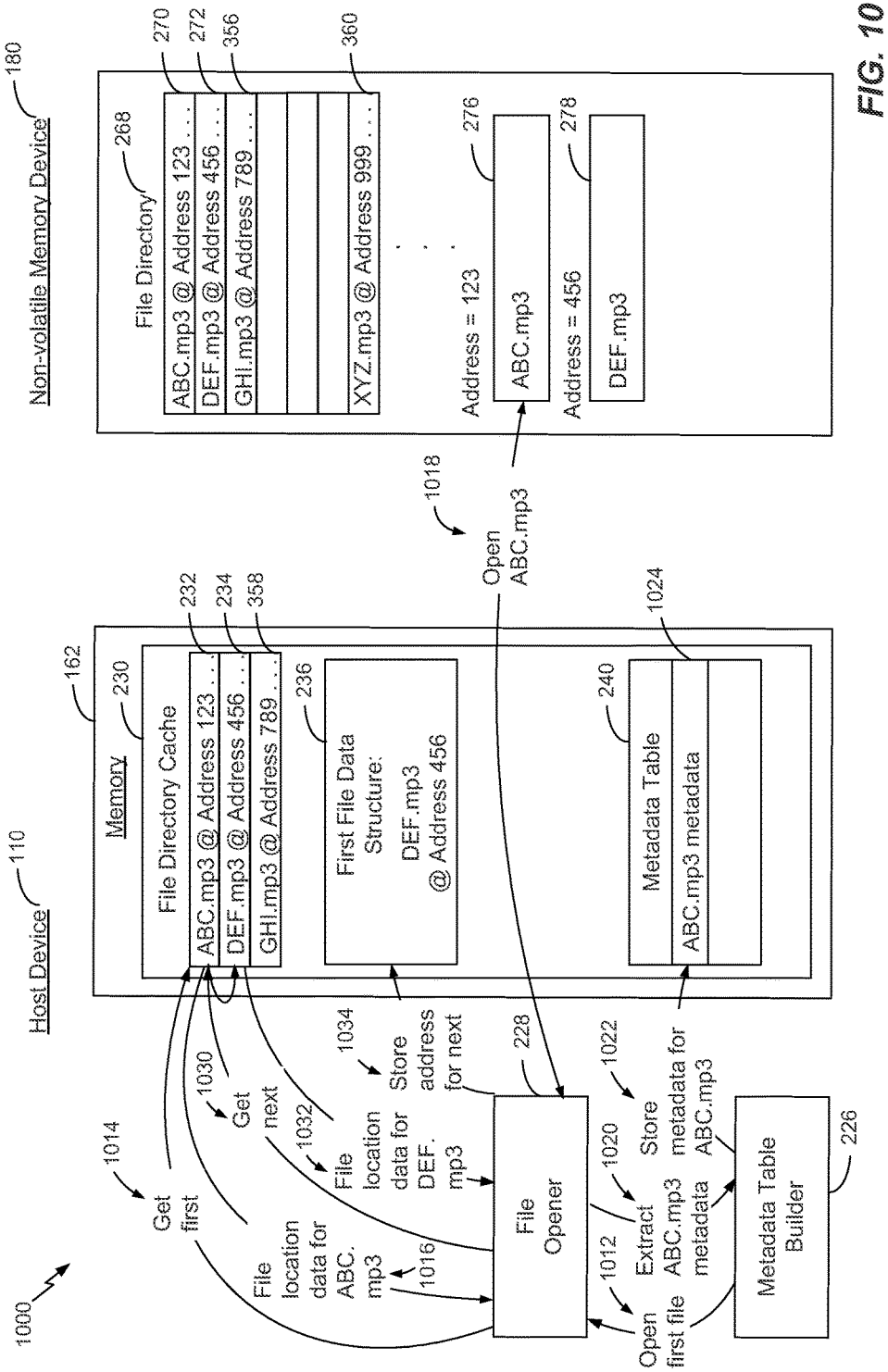
FIGS. 10-11 are data flow diagrams of an application using a file opener according to the present disclosure to increase the speed at which a metadata table may be extracted from data files stored on the non-volatile memory device.
Figure 11:
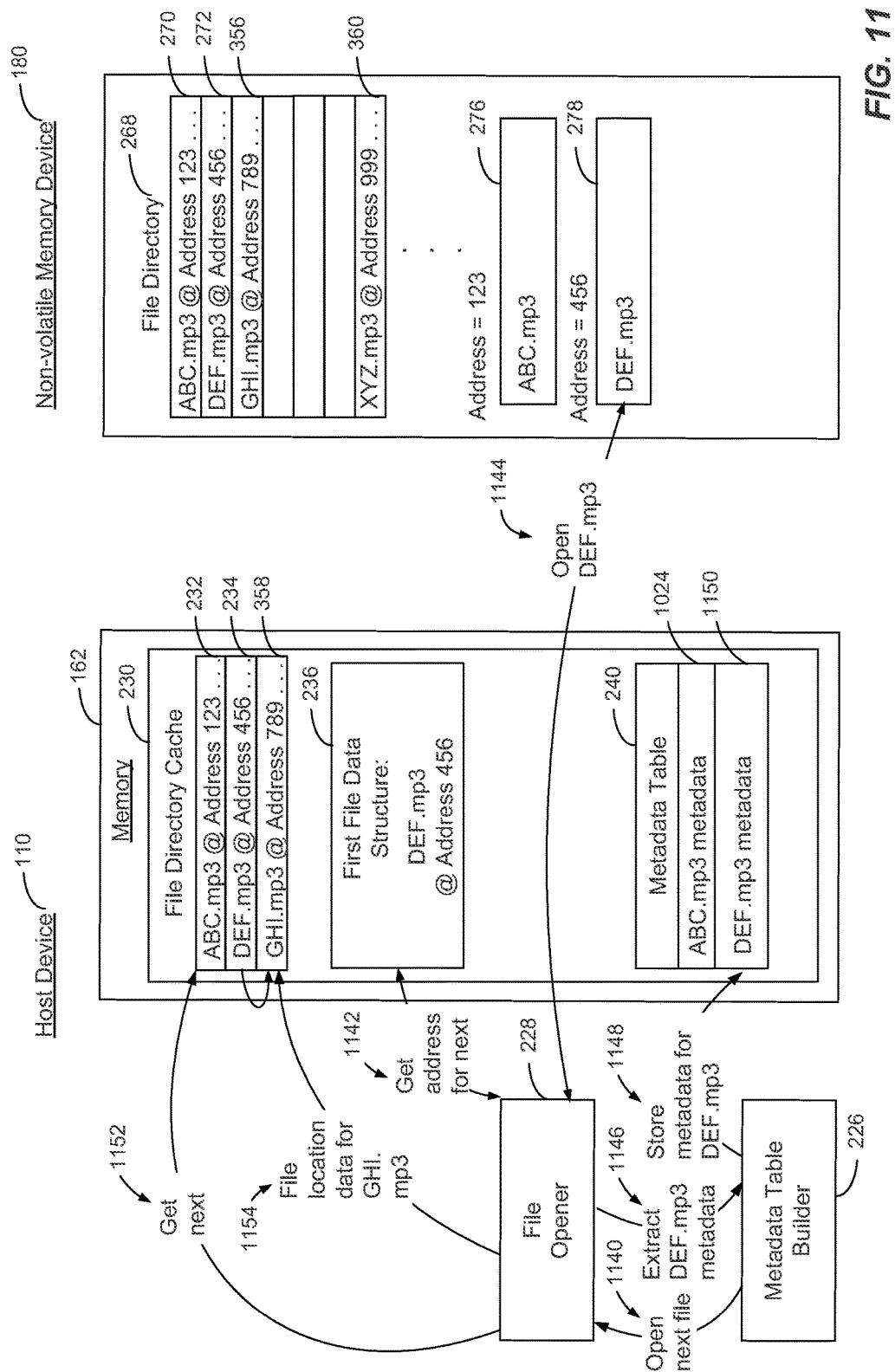

FIGS. 10 and 11 are data flow diagrams of an application using a file opener according to the present disclosure to increase the speed at which a metadata table 240 may be built from metadata extracted from data files stored on the non-volatile memory device 180. FIGS. 10-11 show how the metadata table builder 226 uses the file opener 228 to expedite the generation of a metadata table 240. FIG. 10 shows a system 1000 in which a metadata table builder 226 executing on the host device 110 opens a first file on the non-volatile memory device 180 and the file opener 228 facilitates access to the first file and prepares to access a next file.

FIG. 10 illustrates the metadata table builder 226 generating an open file command 1012 to open the first file or first media file stored in the non-volatile memory device 180. The file opener 228 causes a get first command 1014 to be executed against the file directory cache 230. The get first command 1014 results in retrieval of file location data for the first file or first media file 1016, ABC.mp3 276. According a particular illustrative embodiment, the file opener 228 uses the file location data retrieved for the first file 1016, ABC.mp3 276, to open 1018 ABC.mp3 276. The metadata table builder 226 extracts the ABC.mp3 metadata 1020 and stores the ABC.mp3 metadata in a metadata store operation 1022 in an entry 1024 in the metadata table 240 in the memory 162 of the host device 110. The file opener 228 also issues a get next command 1030 to retrieve file location data for a next file or next media file. The get next command 1030 results in retrieval of the file location data for the next file 1032 or next media file, DEF.mp3 278. The file opener 228 stores the file location data 1034 in the first file data structure 236.

FIG. 11 shows the metadata table builder 226 generating an open file command to open the next file 1140. Instead of scanning the file directory cache to match the name of the file, as previously described, the file opener 228 retrieves the file location data for the next file or next media file 1142, DEF.mp3 278, from the first file data structure 236. The file opener 228 uses the file location data to perform an open operation 1144 to open DEF.mp3. The metadata table builder extracts the metadata for DEF.mp3 in extraction operation 1146 and stores the metadata in a metadata store operation 1148 into in a next entry 1150 in the metadata table 240. To facilitate further building of the metadata table 240, the file opener 228 issues a get next command 1152, resulting in retrieval of file location data for the next file 1154, GHI.mp3. The file opener 228 stores the retrieved file location data (not shown in FIG. 11) in the first file data structure 236.

Figure 12:
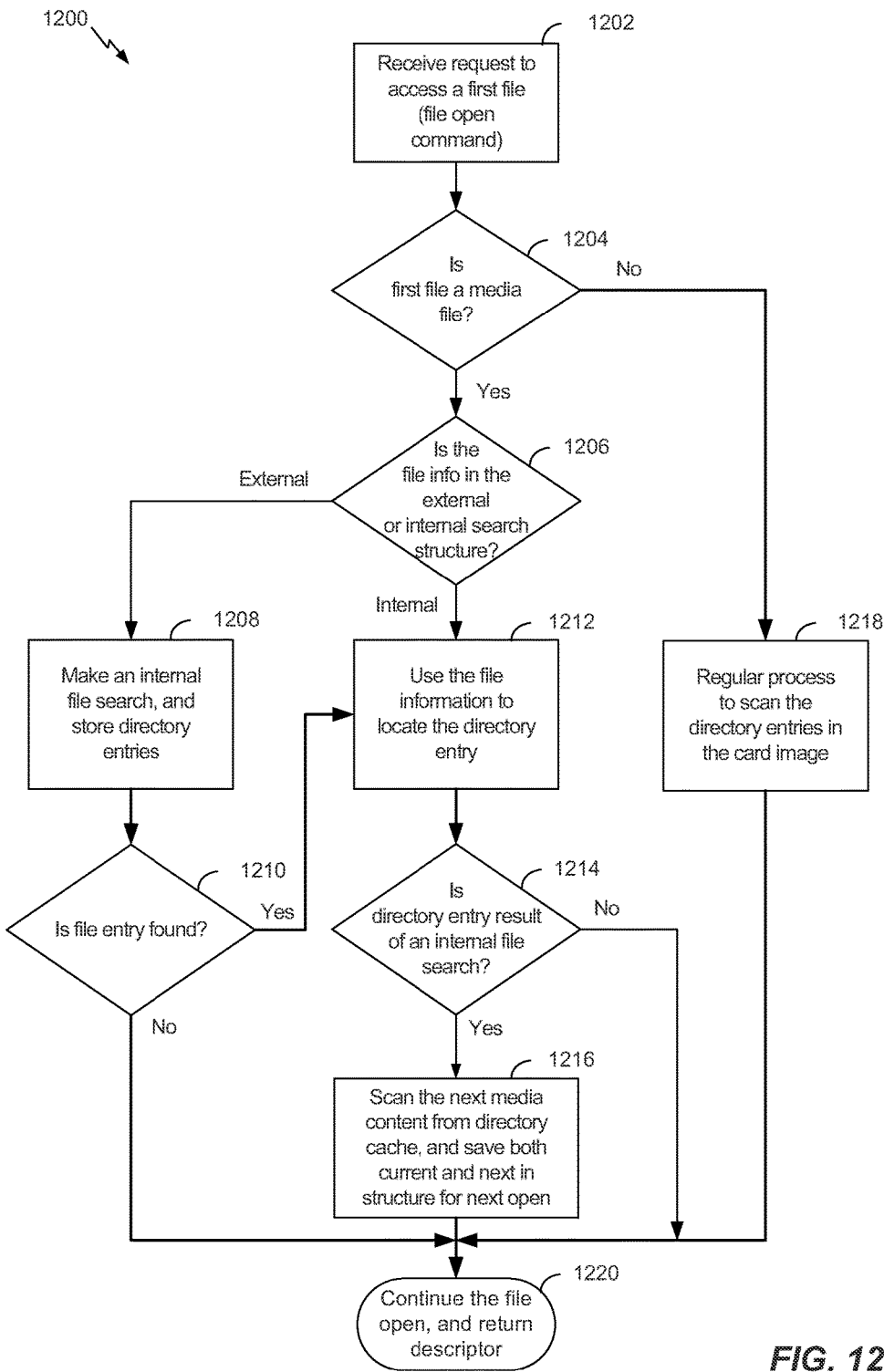
FIG. 12 is a flow diagram of a method according to an embodiment of the present disclosure to use results of an internal memory search or to perform an internal memory search to determine if a next entry in a file directory has been found and stored to facilitate access to the next entry in the file directory.

FIG. 12 is a flow diagram 1200 of a method according to an embodiment of the present disclosure to use results of an internal memory search or to perform an internal memory search to determine if a next entry in a file directory has been found and stored to facilitate access to the next entry in the file directory. A request is received to access a first file, such as a file open command, at 1202. It is determined if the first file is a media file, at 1204. When it is determined at 1204 that the first file sought to be opened is not a media file, a conventional process may be used to scan directory entries in a "card image" of a non-volatile memory device, such as may be stored in a file directory cache of a host device, at 1218. The file open is continued to return a descriptor of the file, at 1220.

When it is determined at 1204 that the first file is a media file, it is determined if file location information is available for the first file in an external or an internal search structure, at 1206. The internal search structure, including one or both of the first data file structure 236 and the second data file structure 238, are populated as previously described by getting file location data for each next media file when a previous media file has been opened. An external search may be a list or table of metadata file locations generated by an application and searchable to locate directory entry information for a requested file. When it is determined at 1206 that the file information is not available from the internal search structure, an internal search is performed of the list of media files, storing file location data in the first data file structure 236 or the second data file structure 238 in a manner similar to searching directory entries as described with respect to FIGS. 3-11, at 1208. It is determined if a file entry for the first file is found, at 1210. When it is determined at 1210 that a file entry is not found for the file, the file open is continued to return a descriptor of the file, at 1120. However, when it is determined that a file entry is found for the first file in the first data file structure 236 or the second data file structure 238, the file information is used to locate the directory entry, at 1212. It is determined whether the directory entry is a result of an internal file search, at 1214. When it is determined at 1214 that the directory entry is not a result of an internal file search at 1214, the file open is continued to return a descriptor of the file, at 1120. Otherwise, when it is determined at 1214 that the directory entry is a result of an internal file search, the next media content is scanned from the directory cache, and both current file location data and next file location data are stored in file data structures 236 and 238 for a next open command, at 1216. The file open is then continued to return a descriptor of the file, at 1120

Figure 13:
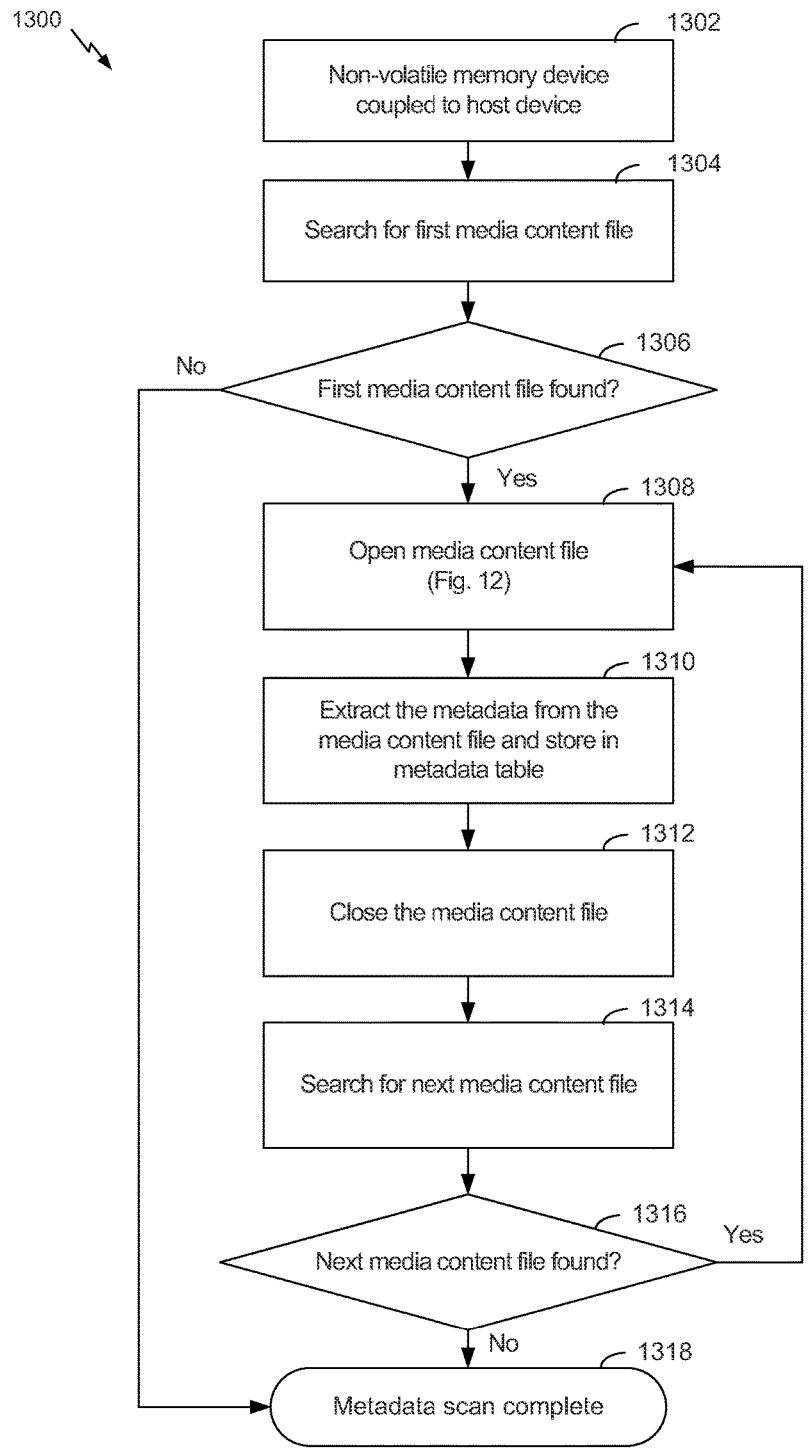
FIG. 13 is a flow diagram of a method according to an embodiment of the present disclosure to, when a non-volatile memory device is coupled to a host device, open media files stored on the non-volatile memory device according to the method of FIG. 12 to build a metadata table for files stored on the non-volatile memory device.

FIG. 13 is a flow diagram of a method 1300 according to an embodiment of the present disclosure to open media files stored on the non-volatile memory device according to the method of FIG. 12 to build a metadata table for files stored on the non-volatile memory device. A non-volatile memory device is coupled to a host device, at 1302. A search is made for a first media content file, at 1304. It is determined whether a first media content file has been found, at 1306. If it is determined that no media content file is found at 1306, the method 1300 advances to 1318 where the metadata scan is considered to be complete. Otherwise, if it is determined at 1306 that a first media content file has been found, the media content file is opened, at 1308, using a process according to the method of FIG. 12 in which file location data for one or more media files is stored in file data structures to bypass performing a name search on a file directory. Metadata is extracted from the media content file and the metadata is stored in a metadata table, at 1310. The media content file is closed, at 1312. A search is made for a next media content file, at 1314. It is determined whether there is a next media content file, at 1316. If it is determined that there is a next media file at 1316, the method moves to 1308 to open the media content file using the method of FIG. 12 in which file location data for one or more media files are stored in file data structures. Otherwise, if it is determined there is no next media file at 1316, the method 1300 advances to 1318 where the metadata scan is considered to be complete.

Figure 14:
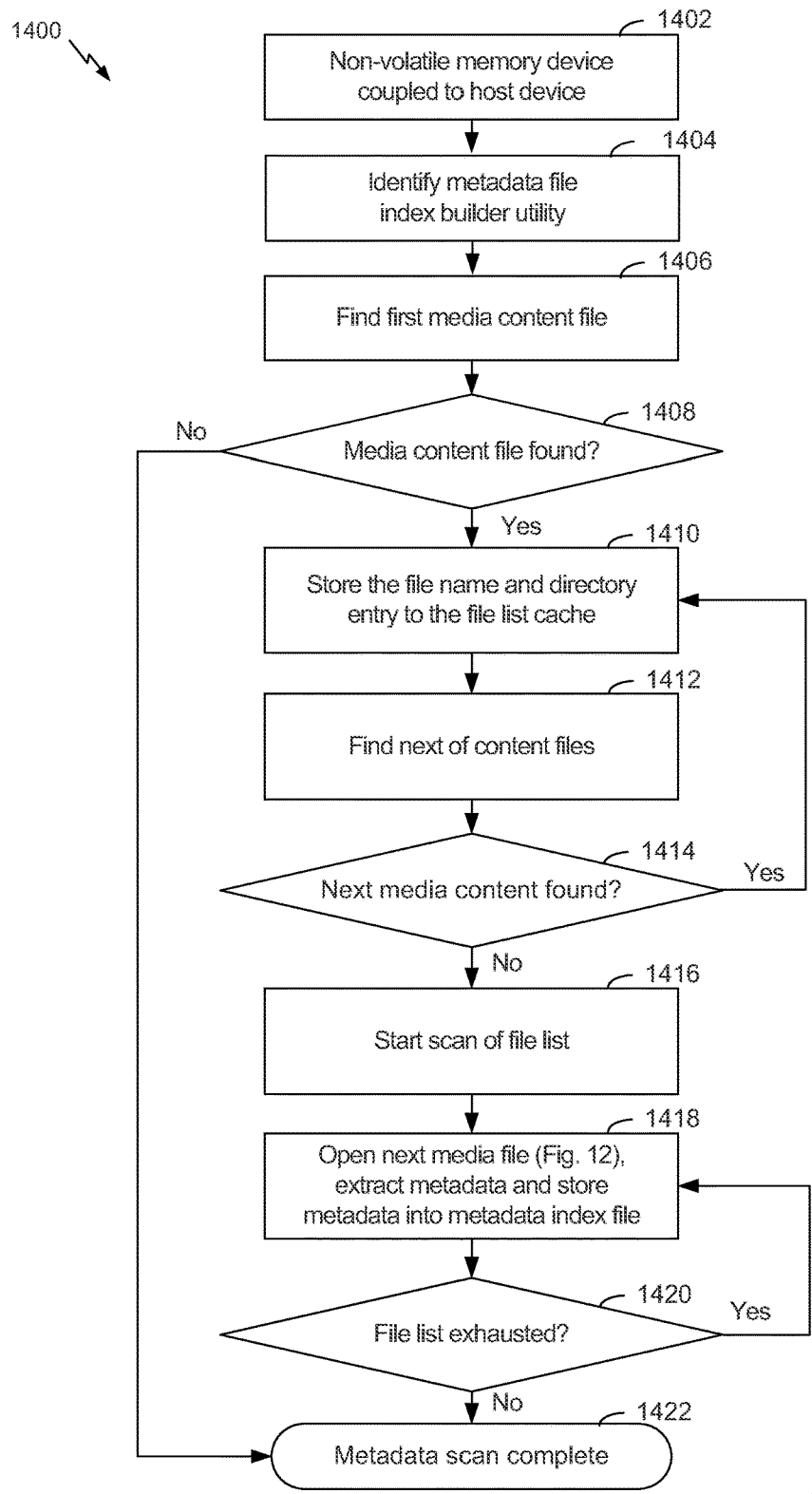
FIG. 14 is flow diagram of another method according to an embodiment of the present disclosure to open media files stored on the non-volatile memory device according to the method of FIG. 12 to build a metadata table for files stored on the non-volatile memory device.

FIG. 14 is flow diagram of another method 1400 according to an embodiment of the present disclosure to open media files stored on the non-volatile memory device according to the method of FIG. 12 to build a metadata table for files stored on the non-volatile memory device.

In the method 1400 of FIG. 14, a non-volatile memory device is coupled to a host device, at 1402. A metadata file index builder utility may be identified, at 1404. A search is made for a first media content file, at 1406. It is determined whether a media content file has been found, at 1408. If it is determined that no first media content file is found at 1408, the method 1400 advances to 1422 where the metadata scan is considered to be complete. On the other hand, if it is determined at 1408 that a first media content file has been found, the file name and directory entry including file location data is stored in a file list cache, at 1410. A search for a next media content file is made, at 1412. If it is determined at 1414 that a next media content file is found, the method 1400 moves to 1410 to store the file name and the directory entry including the file location data is stored in the file list cache.

Instead, if it is determined at 1414 that next media content has not been found, a scan of a file list is started, at 1416. A next media file is opened using the process of FIG. 12, as previously described, and metadata is extracted from the next media file and stored in a metadata index file or metadata table, at 1418. It is determined if the list of media files is exhausted, at 1420. If not, the method 1400 returns to 1410 to open the next media file, extract metadata, and store the metadata into the metadata index file or metadata table. Otherwise, if it is determined the file list is exhausted at 1420, the method 1400 advances to 1422 where the metadata scan is considered to be complete.

Figure 15:
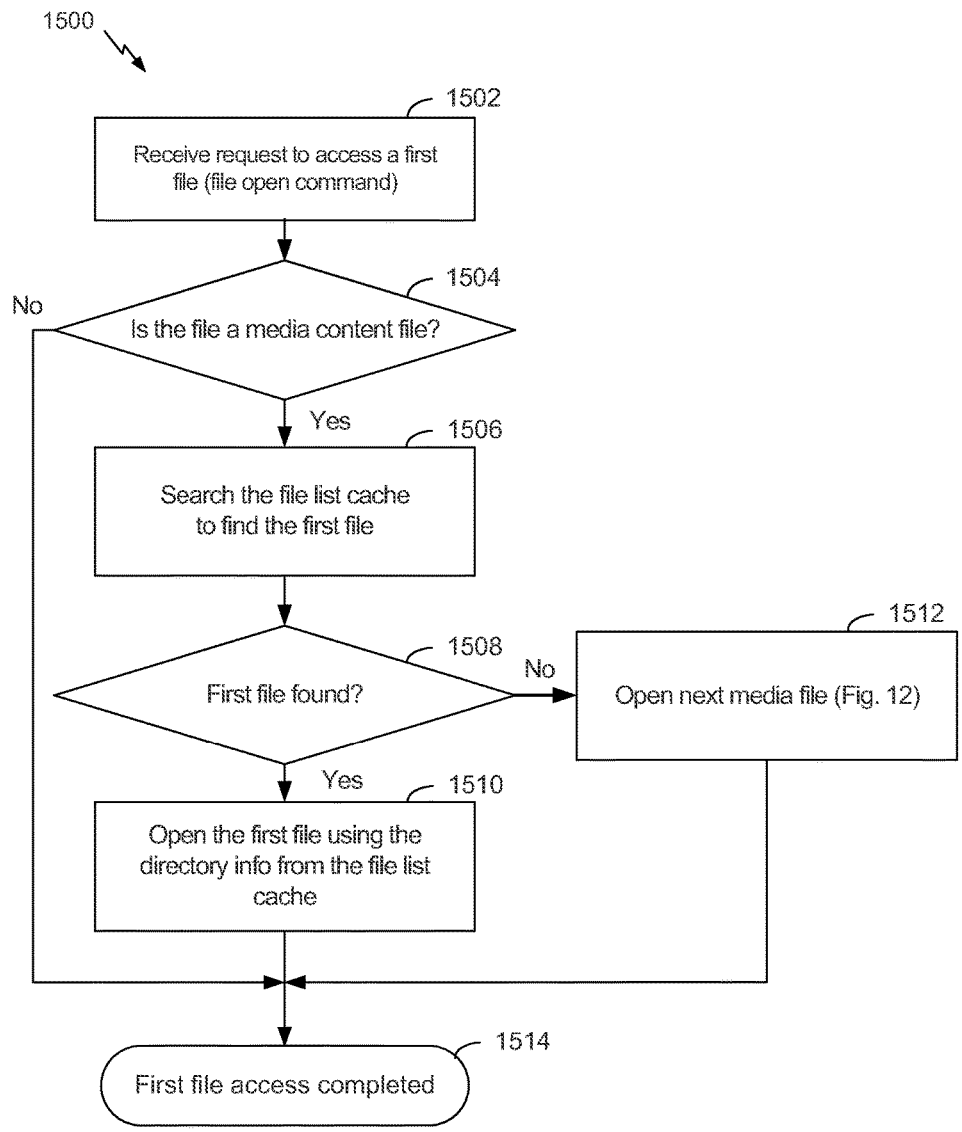
FIG. 15 is a flow diagram of a method according to an embodiment of the present disclosure to, upon receiving a request to access a first file, use the method of FIG. 12 to open a next media file.

FIG. 15 is a flow diagram of a method 1500 according to an embodiment of the present disclosure to, upon receiving a request to access a first file, use the method of FIG. 12 to open a next media file. A request to access a first file, such as by an open file command, is received, at 1502. It is determined whether the file is a media content file, at 1504. If it is determined the file is not a media content file, the method 1500 advances to 1514 where the first file access is considered to be complete. Otherwise, if it is determined at 1504 that the file is a media content file, a file list cache is searched to file the first media file, at 1506. It is determined if the first media file is found, at 1508. If it is determined at 1508 that the first media file has not been found, the file is opened according to the method of FIG. 12, at 1512, where it is determined if file location data is stored in a file data structure, as previously described. Otherwise, if it is determined that the first media file has been found at 1508, the first file is opened using directory information from a file list cache, at 1510. In either case, the method 1500 next advances to 1514, where the first file access is considered to complete.

Figure 16:
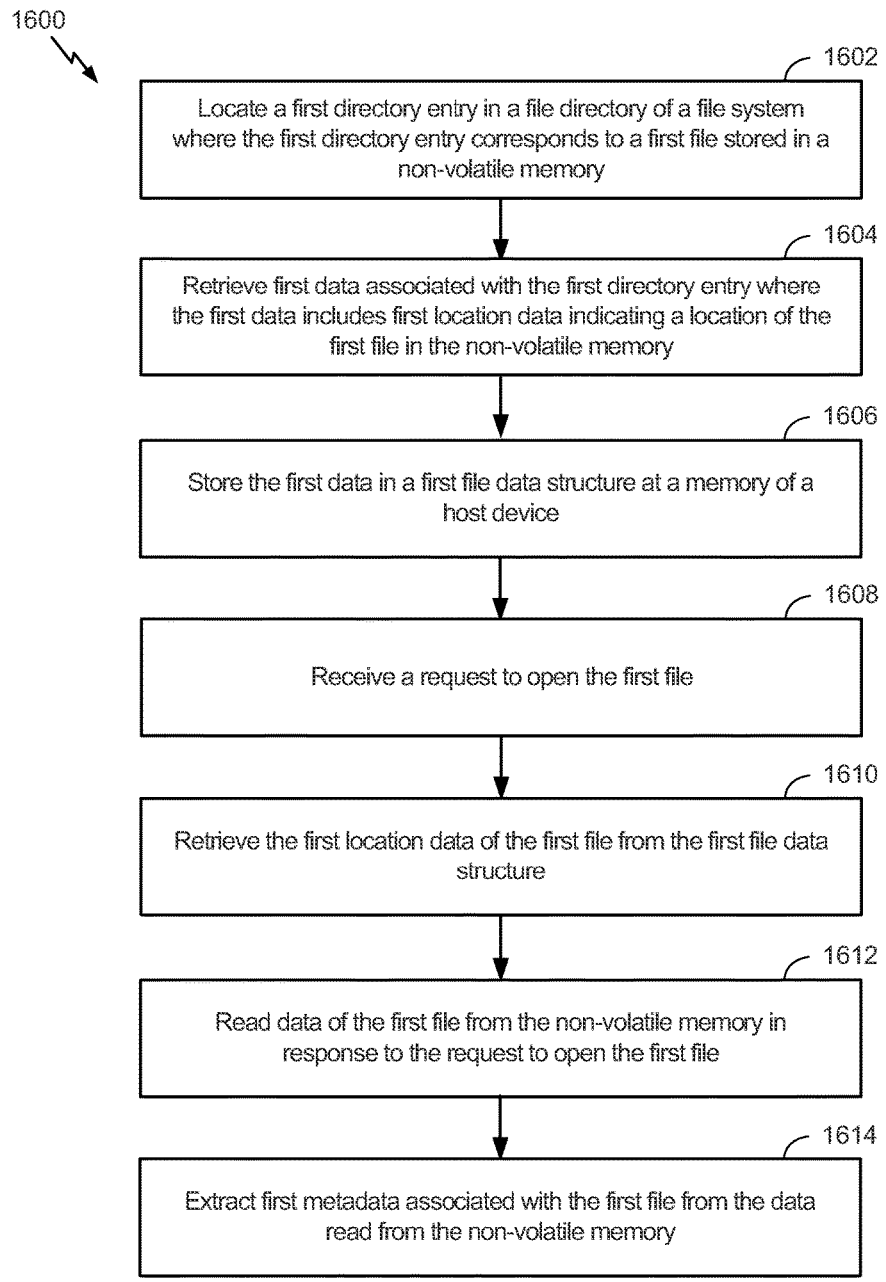
FIG. 16 is a flow diagram of a method according to an embodiment of the present disclosure to store first location data for a first file in a file data structure and to provide the first location data to a request to open the first file.

FIG. 16 is a flow diagram of a method 1600 according to an embodiment of the present disclosure to store first location data for a first file in a file data structure and to provide the first location data to a request to open the first file. The method 1600 is comparable to a process described with reference to FIGS. 3 and 4. In the data flow diagrams of FIGS. 3 and 4, prior to an application or other program generating an open file command to open a first file by name, file location data is retrieved from the file directory cache 230 and stored in the first file data structure 236. Subsequently, when a command is received to open the file for which the file location data was stored in the first file data structure 236, the file location data is provided to the open file command to enable the file to be opened without a search of the file directory cache 230 or the file directory 268.

In the method 1600 of FIG. 16, a first directory entry is located in a file directory of a file system where the first directory entry corresponds to a first file stored in a non-volatile memory, at 1602. First data associated with the first directory entry is retrieved where the first data includes first location data indicating a location of the first file in the non-volatile memory, at 1604. The first data is stored in a first file structure, such as the first file data structure 236 or the second file data structure 238, at a memory of a host device, at 1606. A request to open the first file is received, at 1608. The first location data of the first file is retrieved from the first file data structure, at 1610. Data of the first file from the non-volatile memory is read in response to the request to open the first file, at 1612. First metadata is extracted associated with the first file is extracted from the data read from the non-volatile memory, at 1614.

Figure 17:
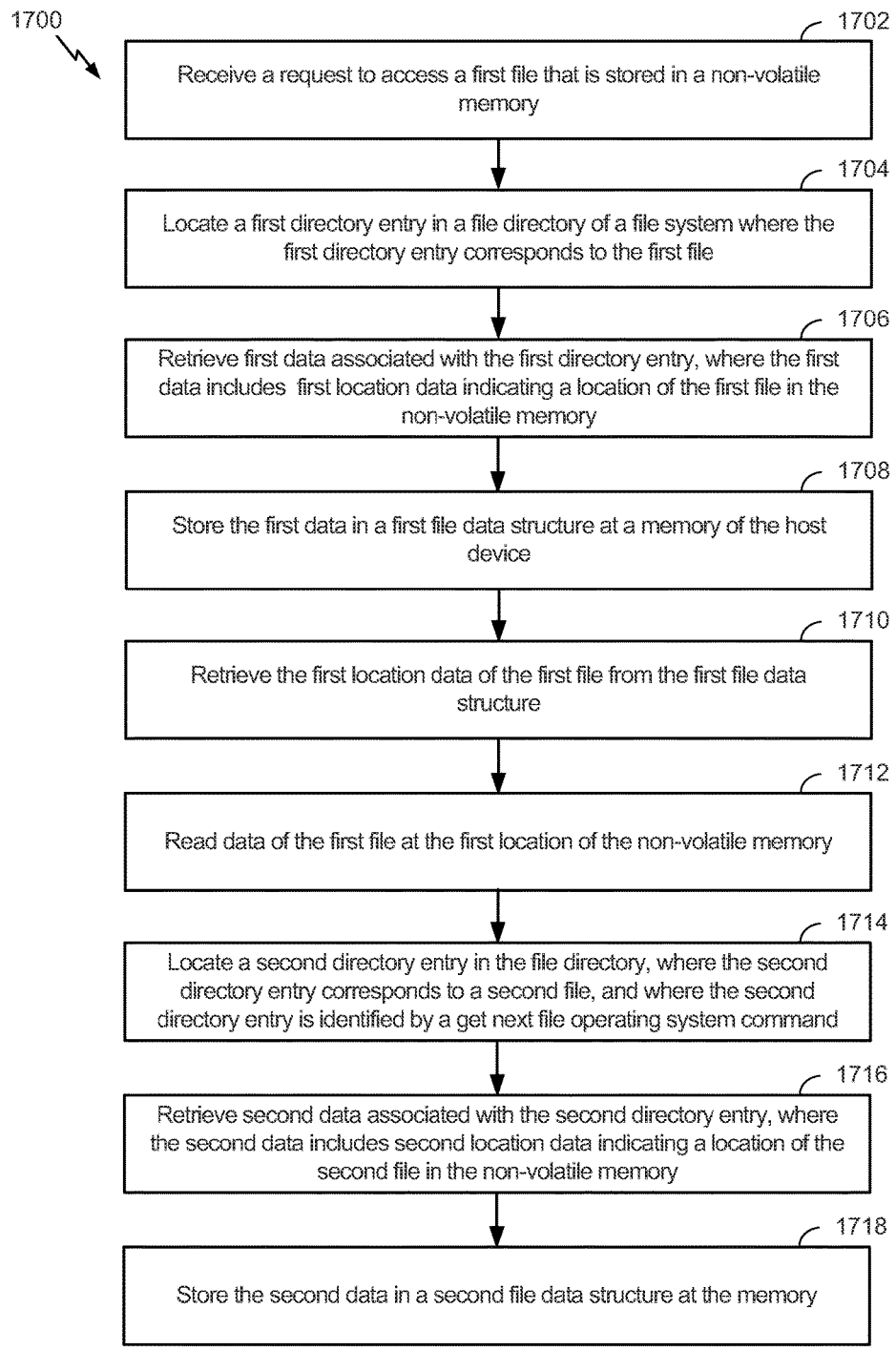
FIG. 17 is a flow diagram of a method according to an embodiment of the present disclosure to store first location data of a first file in a first file data structure and to get second location data of a second file and store the second location data in a second file data structure.

FIG. 17 is a flow diagram of a method 1700 according to an embodiment of the present disclosure to store first location data of a first file in a first file data structure and to get second location data of a second file and store the second location data in a second file data structure. The method 1700 is comparable to a process described with reference to FIGS. 3-5. In the data flow diagrams of FIGS. 3-5, prior to an application or other program generating an open file command to open a first file by name, file location data is retrieved from the file directory cache 230 and stored in the first file data structure 236. Subsequently, when a command is received to open the file for which the file location data was stored in the first file data structure 236, the file location data is provided to the open file command to enable the file to be opened without a search of the file directory cache 230 or the file directory 268. As the file is opened, a second directory entry for a next media file is located and file information for the next media file is stored in a second file data structure 238.

In the method 1700 of FIG. 17, a request to access a first file stored in a non-volatile memory is received, at 1702. A first directory entry in a file directory of a file system is located where the first directory entry corresponds to the first file, at 1704. First data associated with the first directory entry is retrieved, where the first data includes first location data indicating a location of the first file in the non-volatile memory device, at 1706. The first data is stored in a first file data structure at a memory of the host device, at 1708. The first location data of the first file is retrieved from the first file data structure, such as the first file data structure 236, at 1710. Data of the first file at the first location of the non-volatile memory is read, at 1712. A second directory entry in the file directory is located, where the second directory entry corresponds to a second file and where the second directory entry is identified by a get next file operating system command, at 1714. Second data associated with the second directory entry is retrieved, where the second data includes second location data indicating a location of the second file in the non-volatile memory, at 1716. The second data is stored in a second file data structure, such as the second file data structure 238, at the memory, at 1718.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description

What is claimed is:

1. A method comprising:
   receiving, from an application at a host device coupled to a data storage device, a request to open a first file of a plurality of files stored in the data storage device;
   retrieving, by the host device in response to the request to open the first file, first location data of the first file from a file data structure of a plurality of file data structures stored in a memory of the host device, the memory distinct from the data storage device, each of the plurality of file data structures indicating a respective location at which a corresponding file of the plurality of files is stored in the data storage device;
   issuing, by a file opener of a processor of the host device in response to the request to open the first file and prior to or without receiving a second request to open a next file of the plurality of files, a get next command to the memory to retrieve second location data of the next file, wherein the processor extracts metadata from the first file and copies metadata from a metadata table in the memory to the data storage device; and
   initiating, by the processor, outputting of a data item associated with the first file from the host device to the data storage device based on the first location data.

2. The method of claim 1, wherein the processor extracts the metadata from the first file prior to initiating the outputting of the data item.

3. The method of claim 1, wherein:
   the request to open the first file includes an open file command from an operating system at the host device,
   the open file command includes an identifier of a particular file to be opened, and
   the host device retrieves the first location data from the file data structure in response to determining that the identifier matches a second identifier stored in the file data structure.

4. The method of claim 1, further comprising:
   generating at the host device a host file directory that corresponds to at least a portion of a first file directory stored at the data storage device; and
   retrieving location data by scanning the host file directory in response to determining that an identifier of a file to be opened does not match any identifier stored in the file data structure.

5. The method of claim 1, further comprising:
   locating a directory entry in a host file directory copied from a first file directory of the data storage device, wherein the directory entry corresponds to the first file stored in the data storage device;

retrieving the first location data from the directory entry; and storing the first location data in the file data structure.

6. The method of claim 5, further comprising:
locating a second directory entry in the host file directory, wherein the second directory entry corresponds to the next file stored in the data storage device;
retrieving the second location data from the second directory entry, wherein the second location data indicates a location of the next file in the data storage device; and
storing the second location data in a second file data structure of the plurality of file data structures.

7. The method of claim 6, wherein:
the second directory entry is a next sequentially stored directory entry following the directory entry, and
the next sequentially stored directory entry is identified in response to receiving the get next command.

8. The method of claim 1, further comprising:
extracting the data item from the first file, wherein the data item is associated with the first file; and
opening, by the host device, the first file, wherein the first file is opened using the file data structure without performance of a file name search at the host device or at the data storage device.

9. The method of claim 1, further comprising, in response to receiving the second request to open the next file:
transferring content of a second file data structure of the plurality of file data structures to the file data structure; or
re-designating the second file data structure as the file data structure.

10. A host device comprising:
a memory to store a plurality of file data structures, each of the plurality of file data structures indicating a respective location at which a corresponding file of a plurality of files is stored in a data storage device, the data storage device distinct from the memory;
a file opener to retrieve first location data of a first file from a file data structure of the plurality of file data structures in response to a request to open the first file stored in the data storage device and to cause issuance of a get next command to the memory to retrieve second location data of a next file of the plurality of files in response to the request to open the first file;
a table builder to extract metadata from the first file and to copy metadata from a metadata table in the memory to the data storage device; and
an interface to output a data item associated with the first file from the host device to the data storage device based on the first location data.

11. The host device of claim 10, wherein:
the file data structure is configured to enable the host device to open the first file without performance of a file name search at the host device or at the data storage device,
and the table builder is configured to store the data item in the metadata table.

12. The host device of claim 11, wherein:
the table builder is further configured to copy the metadata table from the host device to the data storage device, and
the metadata table is configured to be copied from the data storage device to a second host device in response to the data storage device being coupled to the second host device.

13. The method of claim 1, further comprising:
in response to the first location data not being stored in the file data structure, accessing by the processor one of:
a second file data structure stored at the host device, the second file data structure configured to store second location data of a second file in the data storage device; and
a file directory, the file directory copied from the data storage device.

14. The method of claim 1, wherein:
the request to open the first file is received after a file directory is copied from the data storage device to the host device, and
the file directory is accessed after accessing a second file data structure of the plurality of file data structures and after determining that the first location data is not in the second file data structure.

15. The method of claim 1, further comprising:
storing the first location data in the file data structure prior to receiving the request to open the first file; and
storing the metadata in the metadata table, wherein the metadata stored in the metadata table is associated with the first file.

16. The method of claim 1, further comprising:
in response to the get next command, predictively fetching the second location data; and
after predictively fetching the second location data, receiving the second request to open the next file, wherein the get next command and the second request to open the next file are issued at the host device.

17. The method of claim 1, further comprising:
in response to receiving the request to open the first file:
reading data of the first file from the data storage device based on the first location data; and
retrieving the second location data from a second file data structure of the plurality of file data structures;
after receiving the request to open the first file, receiving the second request to open the next file; and
in response to the second request to open the next file, reading data of the next file from the data storage device based on the second location data.

18. An apparatus comprising:
means for providing an interface to means for storing a plurality of files;
means for processing data, the means for processing data coupled to the means for providing and configured to:
receive a request to open a first file of the plurality of files;
retrieve, in response to the request to open the first file, first location data of the first file from a file data structure of a plurality of file data structures stored in a memory of the means for processing data, the memory distinct from the means for storing, each of the plurality of file data structures indicating a respective location at which a corresponding file of the plurality of files is stored in the means for storing;
issue, in response to the request to open the first file and prior to or without receiving a second request to open a next file of the plurality of files, a get next command to the memory to retrieve second location data of the next file;
extract metadata from the first file; and
copy metadata from a metadata table in the memory to the means for storing; and
means for outputting a data item associated with the first file from the means for processing data to the means for storing based on the first location data.

19. The apparatus of claim 18, wherein:
the means for processing data is configured to execute an application configured to issue the request to open the first file,
the get next command is issued by a file opener at the means for processing data, and
the first file and the next file have an audio file type.

* * * * *